(12) United States Patent  (10) Patent No.: US 7,673,916 B2
Greenhill et al.  (45) Date of Patent: Mar. 9, 2010

(54) END EFFECTORS

(75) Inventors: Richard Martin Greenhill, London (GB); Hugo Ellas, London (GB); Richard Walker, London (GB); Matthew Godden, Luton (GB)

(73) Assignee: The Shadow Robot Company Limited, London (GB)

( * ) Notice: Subject to any disclaimer, the term of this patent is extended or adjusted under 35 U.S.C. 154(b) by 265 days.

(21) Appl. No.: 11/198,845

(22) Filed: Aug. 8, 2005

(65) Prior Publication Data

US 2007/0040400 A1  Feb. 22, 2007

(51) Int. Cl.
*B25J 15/10* (2006.01)

(52) U.S. Cl. .......................................... 294/106; 901/39

(58) Field of Classification Search ................. 294/111, 294/106, 902; 901/36, 27, 30, 39
See application file for complete search history.

(56) References Cited

U.S. PATENT DOCUMENTS

| 1,298,502 A | * | 3/1919 | Henning | 623/63 |
| 2,847,678 A | * | 8/1958 | Opuszenski | 623/64 |
| 3,694,021 A | | 9/1972 | Mullen | |
| 4,246,661 A | * | 1/1981 | Pinson | 294/111 |
| 4,351,553 A | * | 9/1982 | Rovetta et al. | 294/106 |
| 4,921,293 A | | 5/1990 | Ruoff | |
| 4,955,918 A | * | 9/1990 | Lee | 623/24 |
| 4,980,626 A | | 12/1990 | Hess | |
| 5,062,673 A | | 11/1991 | Mimura | |
| 5,080,682 A | | 1/1992 | Schechtman | |
| 5,447,403 A | * | 9/1995 | Engler, Jr. | 901/39 |
| 5,647,723 A | | 7/1997 | Rush | |
| 6,244,644 B1 | | 6/2001 | Lovchik | |
| 6,517,132 B2 | * | 2/2003 | Matsuda et al. | 901/39 |

* cited by examiner

*Primary Examiner*—Paul T Chin
(74) *Attorney, Agent, or Firm*—McDermott Will & Emery LLP

(57) ABSTRACT

An end effector includes a base part and a first member. The first member includes first, second, and third serially articulated struts. The first strut articulates with the base part for relative angular displacement about a first pitch axis and about a first roll axis. The first roll axis is substantially orthogonal to the first pitch axis. The second strut articulates with the first strut for relative angular displacement about, firstly, a first yaw axis substantially orthogonal to the first pitch axis and the first roll axis, and, secondly, about a second pitch axis substantially parallel to the first pitch axis and substantially orthogonal to the first yaw axis. The third strut articulates with the second strut for relative angular displacement about a second yaw axis substantially parallel to the first yaw axis.

8 Claims, 3 Drawing Sheets

END EFFECTORS

FIELD OF THE INVENTION

The invention hereinafter disclosed relates to constructs for end effectors and is particularly, though by no means exclusively, concerned with end effectors in the form of anthropomorphic artificial hands, hands, that is to say, capable of being employed in robotic, and in prosthetic or haptic or tele-prosthetic, applications.

BACKGROUND TO THE INVENTION

It is a prime goal for designers and inventors in the technical field, to provide an artificial hand as aforesaid approximating to the human hand as regards form factor—size, strength, and weight and above all, perhaps, a hand which is substantially indistinguishable from the human hand as regards dexterity, its manipulative ability.

There have, over the years, been numerous attempts made by various individuals and organisations, to provide such an artefact, and whilst considerable progress has been achieved to date, the hand designs have invariably fallen short of the above mentioned characteristics in one respect or another.

BRIEF DESCRIPTION OF THE PRIOR ART

The leading reference appears to be U.S. Pat. No. 6,244,644 (Lovchik and Diftler). Other references are to U.S. Pat. No. 5,647,723 (Ruff); U.S. Pat. No. 5,080,682 (Schectman); U.S. Pat. No. 5,062,673 (Mimura); U.S. Pat. No. 4,955,918 (Sukhun Lee); U.S. Pat. No. 4,921,293 (Ruoff and Salisbury); U.S. Pat. No. 3,694,021 (Mullen); U.S. Pat. No. 4,980,626 (Hess); U.S. Pat. No. 4,246,661 (Pinson); and International Patent Application WO 00/69375A1 (Rutgers, The State University of New Jersey)

For a comprehensive survey, at its publication date, of anthropomorphic robotic hands, recourse might profitably be had, also, to the paper "How Far is the Human Hand; A Review of Anthropomorphic End Effectors?" by L Biagiotti, F Lotti, C Melchiori, and G Vassura, being a paper made available to the public at the University of Bologna website: http://www.lar.deis.unibo.it/cgi-bin/woda/publications.cgi.pl/show The problem is of course, to provide an anthropomorphic hand having the form factor and capable of producing substantially all of the dextrous movements of the human hand but employing wholly mechanical elements in its construction and action. Whilst each of the aforementioned prior art references describes an artificial anthropomorphic hand, none of these or any other artificial hand of which Applicant is aware, possesses the 24 degrees of freedom necessary for it to be regarded as a satisfactory emulation of the human hand.

SUMMARY OF THE INVENTION

End effectors in accordance with the invention may take the form of complete artificial hands or they may be of a simpler configuration. In all end effectors in accordance with the invention however a thumb-representing digit having the characteristic features hereinafter describe is to be found. In the basic form, an end effector has a thumb-representing digit and a finger-representing digit both as hereinafter describe and/or as claimed.

It is a primary object, however, of the invention of the invention to present a design for an anthropomorphic hand which it is believed, surpasses those currently available or presently contemplated. The artificial mechanical hand envisaged is, to the best of Applicant's knowledge and belief the first to possess the capability of executing all of the movements of which the human hand is capable.

End effectors within the scope of the invention are to share the characteristics set forth in the claims appended hereunto and in summary, the aforesaid claims and their interdependencies are to be regarded substantially as being set out, mutatis mutandis, here also.

Whilst digits to the finger-representing configuration are not, per se novel two features of importance in the hands as hereinafter described and as claimed are to be noted, firstly the structure and consequent kinematics of the thumb-representing digit of the hand secondly the two-part structure of the palm-representing part of the hand and the articulation of one of these palm parts with in one case, the fourth, and, in another, the third and fourth finger-representing digits of the hand. These features, being, it is believed, novelties are of significantly only in relation to the kinematics of other characteristic features, in particular, a finger-representing or finger-representing digits present in the end effector. So, for example, whilst a digit to the novel thumb-representing configuration has, potentially application to artefacts incorporating less than, or more than, the full number of finger-representing digits, in the case of the substantially fully anthropomorphic hand, both of the aforesaid novel features are to be present.

Figure 1:
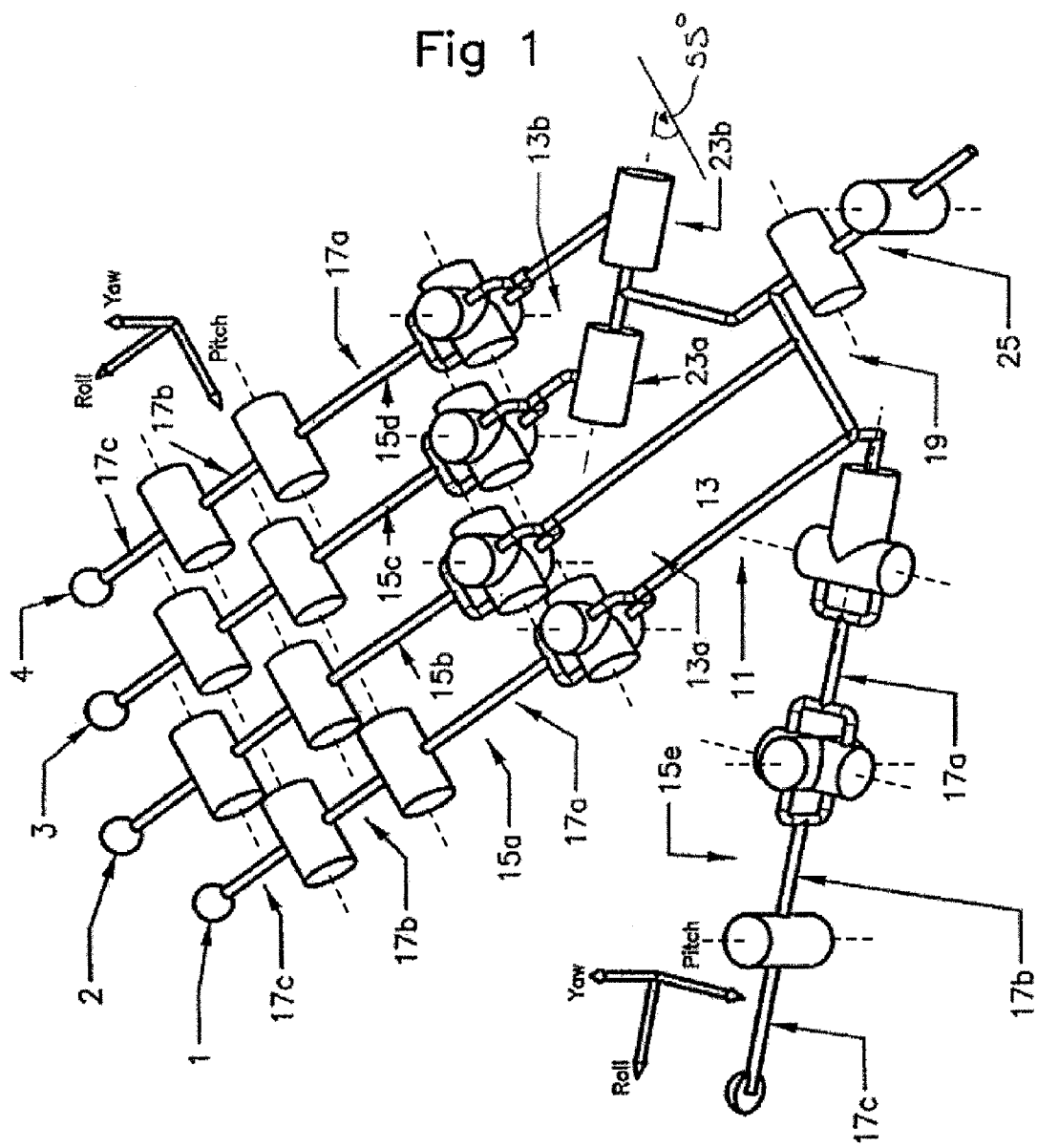
FIG. 1 is a diagram showing, schematically, what might, for simplicity, be referred to as the endo-skeletal characteristics of anthropomorphic hands in accordance with the invention.

A DESCRIPTION OF CHARACTERISTIC FEATURES OF A PREFERRED EMBODIMENT OF THE INVENTION

The kinematics of an anthropomorphic hand in accordance with the invention should be apparent from the Figures of the drawings. Throughout the ensuing description and in the accompanying claims, the expressions "local yaw", local pitch", and "local roll" are employed in relation to axes about which angular displacements of the phalanges of the finger- or thumb-representing digits of the endo-skeletal hand depicted are to occur. This terminology has been adopted in preference to the use of the terms "yaw", "pitch" and "roll", simpliciter, (with all of the associations that such terms have with motions of a marine or an aircraft with respect to earth axes), and in order, especially, to avoid the use of formal mathematical methods, based on Euler angles, and the opaque language that would then have to be employed, using such a convention, in the description and in the claiming clauses of this Application. It is thought that a satisfactory appreciation of the constructional features of hands in accordance with the invention can be got using the chosen expressions, even though this may entail a certain loss of mathematical rigour in the presentation.

In accordance with the above-stated convention, the artificial hand comprises, endo-skeletally, a base part 11, being, in the examples with reference to the accompanying drawings, a palm-defining structure 13 having first and second articulated palm parts 13a, 13b, respectively; first, second, third and fourth finger-representing digits 15a to 15d, respectively; and to one side of said first finger-representing digit 15a, corresponding to the index finger of the human hand, a thumb-representing digit 15e, the several said digits 15a to 15e each having three serially articulated struts 17a to 17c corresponding, respectively, to the proximal, middle, and distal phalanges of the human hand. The articulations of the palm parts 13a, 13b, and of said phalange-representing struts 17a to 17c, inter se, and with the palm-defining structure 13 of the several digits 15a to 15e, are all as hereinafter described in greater detail.

Specifically, in the embodiment of FIG. 1, and with reference to the sets of coordinate axes shown, the proximal struts 17a of the finger-representing digits 15a and 15b are articulated each at one end thereof with said first palm part 13a for angular displacement with respect thereto, about, firstly local yaw first and second local axes, respectively, and, secondly, about local pitch first and second local axes, respectively. The proximal struts 17a of the finger-representing digits 17c and 17d are, on the other hand, correspondingly articulated each at one end thereof with said second palm part 13b.

The middle struts 17b of each of the finger-representing digits 15a and 15b are articulated with respective ones of the proximal struts 17a of the relevant said digit for angular displacement about local pitch third and fourth local axes, respectively, the latter axes being displaced with respect to one another in the roll direction of the digits.

The distal struts 17c of the digits 15a, 15b, are, similarly, articulated each with respective ones of the middle struts 17b of the relevant said digit for angular displacement about local pitch fifth and sixth local axes, respectively, the latter axes being, as before, displaced with respect to one another in the roll direction of the digits.

As with the digits 15a, 15b, so, too, the proximal phalange-representing struts 17a of the third and fourth finger-representing digits 15c, 15d, respectively, are articulated each at one end thereof, but, in this case, with the second palm part 13b, for angular displacement with respect to said second palm part 13b about, firstly, local yaw, longitudinally displaced, seventh and eighth local axes, respectively, and, secondly, about local ninth and tenth axes, being axes which are respectively inclined each at an acute angle, nominally 55°, in the direction towards the first and second dinger-representing digits 15a, 15b.

The proximal strut 17a of the thumb-representing digit 15e is articulated with the first palm part 13a for angular displacement about two orthogonal axes, the one a local pitch eleventh local axis, the other a local roll twelfth local axis.

The middle strut 17b of the thumb-representing part 15e is articulated with the proximal strut 17a thereof, for angular displacement therebetween about, firstly, a local yaw thirteenth local axis, and, secondly, about a local pitch fourteenth local axis.

The distal strut 17c of the thumb-representing digit 15e is articulated with the middle strut 17b thereof, for angular displacement about a local yaw fifteenth local axis.

The proximal strut 17a of the thumb-representing digit 15e is articulated, as aforesaid, with the first palm part 13a at a location substantially closer to the margin 19 of said palm part 13a, being the margin remote from the free extremities 21a, 21b, respectively, of the first and second finger-representing digits 15a, 15b, respectively, than the articulation between the first struts 17a, 17b, of the first and second finger-representing digits, respectively, of said first palm part 13a.

Joints 23a, 23b, respectively, provide inclined axes for angular displacement between the first and second palm parts 13a, 13b, thereby to enable the palm to curl slightly, allowing (FIG. 1) the third and fourth digits 15c, and 15d, better to oppose the thumb-representing digit 15e. The joints 23a, 23b, respectively, might be regarded as fifth joints for each of the third and fourth finger-representing digits 15c and 15d. The joints are essentially co-planar with the palm, and, as stated, nominally at 55° from the pitch axis.

Figure 2:
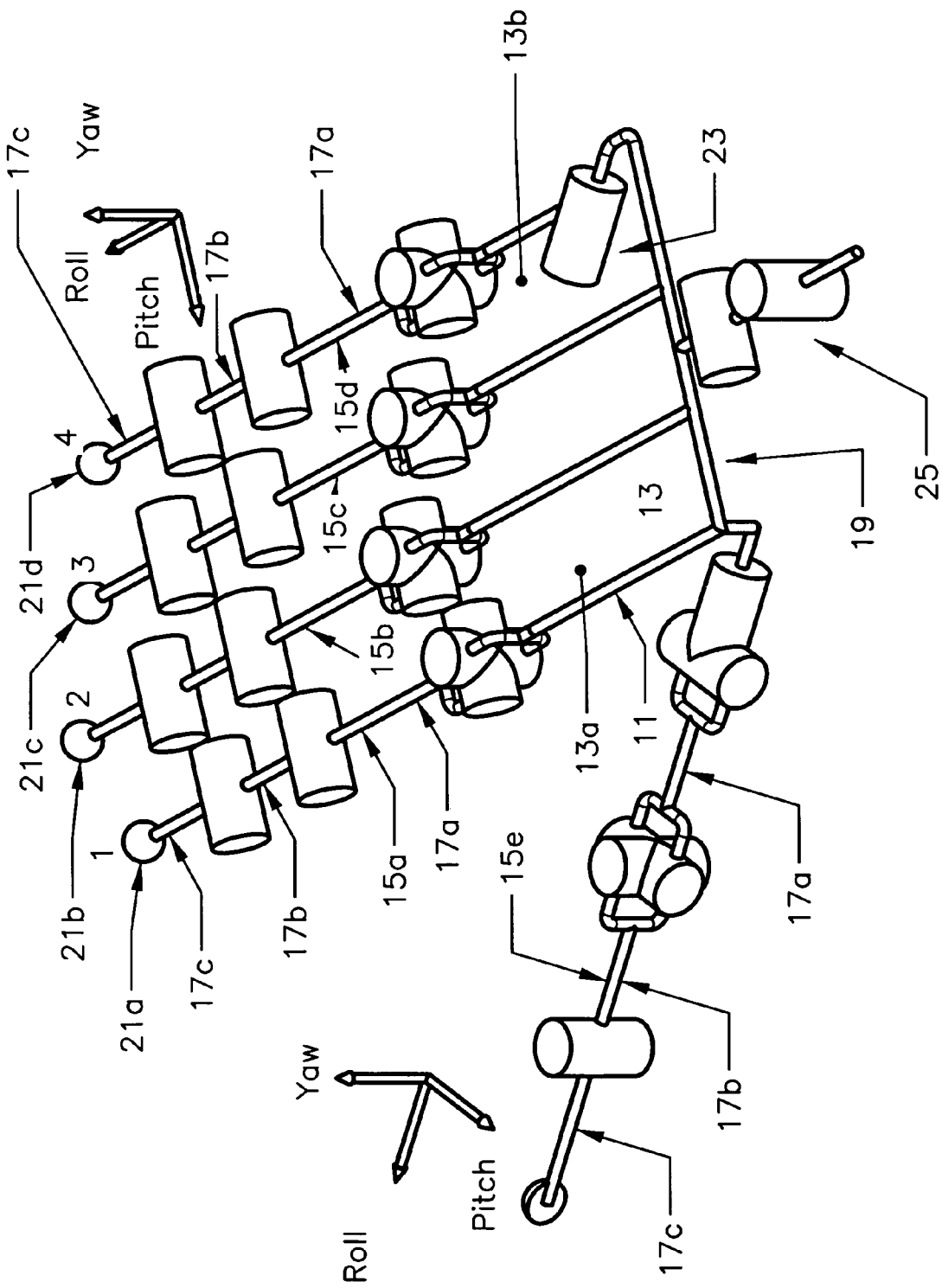
FIG. 2 is a diagram, showing a variant form for the endo-skeletal structure of anthropomorphic hands in accordance with the invention; and, FIG. 3 is a pictorial diagram of an anthropomorphic hand, being a hand based on an endo-skeletal structure as depicted in FIG. 1 or, in an alternative, in FIG. 2 and revealing certain features of the hand and of a wrist section by which the hand is articulated with the fore-arm section of an anthropomorphic arm.
Figure 3:
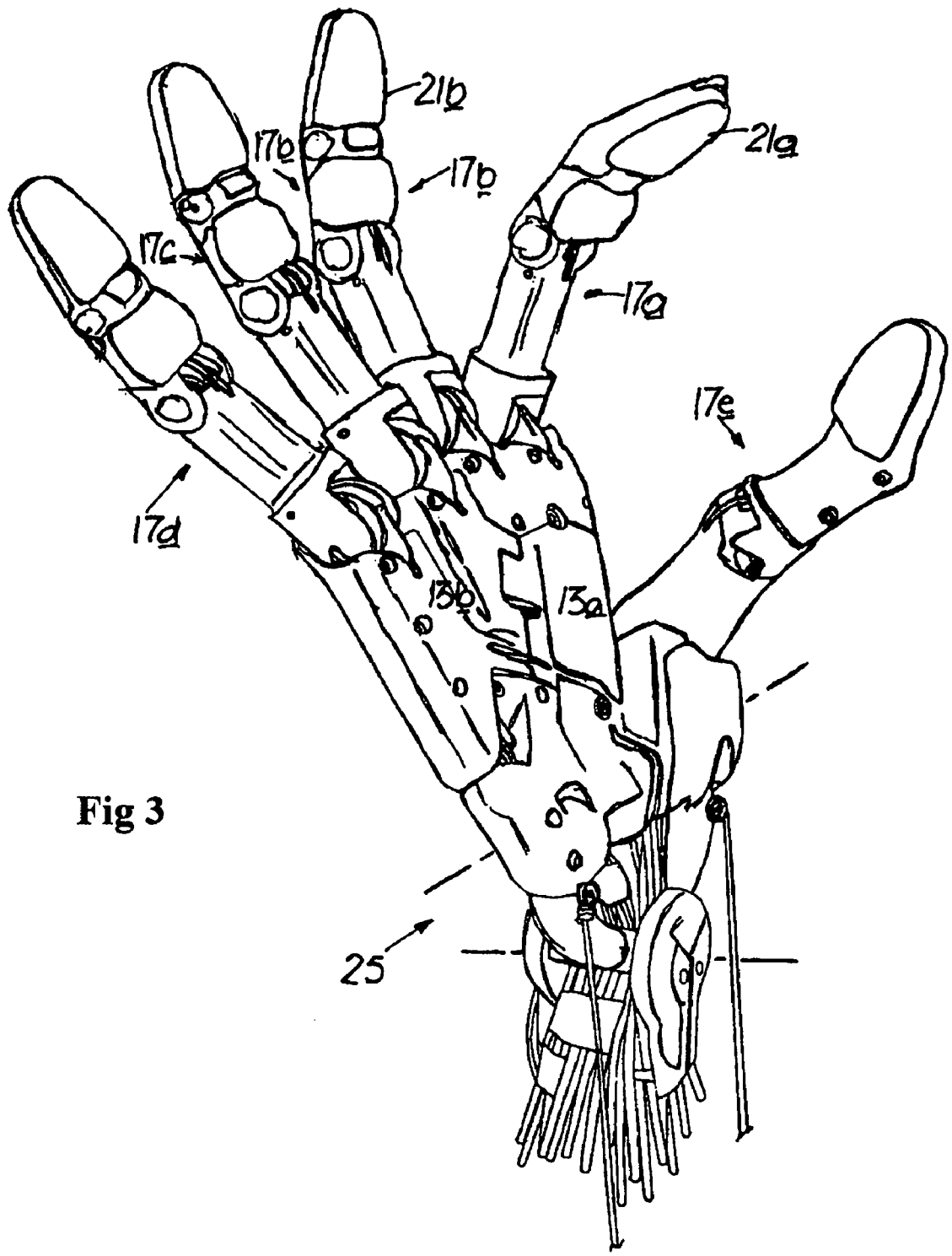

In the endo-skeletal hand of FIG. 2, one only, joint 23 articulating the fourth finger-representing digit 15d with the palm part 13b for angular displacement about an axis inclined as aforesaid. Whilst hands to the configuration of FIG. 3 are, somewhat more limited in range of movement allowed the finger-representing digit 13c, than is the case with the hand of FIG. 1, the overall dexterity of the hand is not thereby seriously degraded.

The thumb-representing digit 15e comprises, as may be gathered, five joints, two 'local pitch', two 'local yaw', and one 'local roll' and is capable of very similar movement to that encountered with the human thumb.

Of these joints, that between the distal and middle phalanges of the thumb-representing digit 15e comprises a simple local yaw joint with a range of between −45° and 90°. The joint between the middle and proximal phalanges has local pitch and local yaw axes of relative displacement, these displacements being in the ranges −20° to +20° and −30° to +60°, respectively. The aforesaid movement about the last mentioned local pitch axis is, perhaps, unfamiliar to most people, its range of movement being small. The movement may, however be observed in the human hand when stroking the tips of the four fingers with the tip of the thumb.

The joint between the thumb-representing digit 15e and the first palm parts 13a has two local axes of angular displacement, the first permitting angular displacement about a local pitch axis, and is responsible for bringing the thumb-representing digit 15e from a position co-planar to the palm, to a perpendicular one, the other permitting angular displacement about the local roll axis. When the thumb-representing digit 15e is perpendicular to the palm, its angular displacement about the latter axis serves to bring it towards the finger-representing digits.

In practice, the anthropomorphic hand constitutes the terminal portion of a hand/forearm combination, being articulated with the forearm portion at a wrist-representing joint 25 having two axes of angular movement the one local pitch, the other local yaw, allowing angular movement similar to that of the human wrist.

The axes of angular displacement of the wrist representing joint 25 do not intersect. In consequence of this, cross-coupling effects arising from relative movements between around forty tendon-representing members as they pass through the wrist-representing joint may be kept within acceptable bounds.

Angular displacement of any part of the hand about an axis is controlled by a pair of tendon-representing members, as aforesaid. Pulling on one such tendon causes angular displacement about an axis in one sense, on the other, angular displacement in the opposite sense. Pulling both such tendon-representing members simultaneously creates stiffness between parts articulated for rotational movement about the relevant axis of angular displacement.

Each tendon-representing member is connected to either an actuator, suitably an air muscle, or to a spring, in the fore-arm (neither the air muscle or other actuator, or the spring, being shown) and is routed through the centre of each joint through which the member is routed, through guide means (not shown) to the part to be controlled under tension applied to the relevant tendon-representing member.

Angular displacement about the several axes is sensed by a combination of magnet and Hall-effect sensor. On one side of a joint about an axis of which angular displacement may occur, a magnet (not shown) is fixed, and, on the other side of the joint, a Hall-Effect sensor (not shown) is stationed. With angular displacement of one part with respect to another about the joint axis, the direction of the magnetic field through the Hall-Effect sensor changes, causing a corresponding change in its output voltage. The voltage output of the Hall-Effect sensor is measured by a near-by A to D Converter chip (not shown).

All of the foregoing and other features besides, including tactile sensors and simulated flesh covering for the hand flesh, and fingernails, are to be found in the finished hand, the hand, that is, substantially as show in FIG. 3. In FIG. 3, flesh simulating covering is shown only as regards the distal and middle phalanges of the several digits 15a to 15e. For a more adequate presentation of matters relating to touch sensing and the associated flesh simulating covering of parts of the several digits 15a to 15e, reference should be had to the disclosure contained in Applicant's co-pending UK Patent Application GB No. 0503015.0.

The invention claimed is:

1. An end effector, comprising:
   a base part; and
   a first member having: first, second, and third, serially articulated struts, the first strut of the first member being articulated with the base part, the second strut being articulated with the first strut, and the third strut being articulated with the second strut,
   wherein the first strut is articulated with the base part for relative angular displacement about a first pitch axis and about a first roll axis substantially orthogonal to the first pitch axis,
   wherein the second strut is articulated with the first strut for relative angular displacement about, firstly, a first yaw axis substantially orthogonal to the first pitch axis and the first roll axis, and, secondly, about a second pitch axis substantially parallel to the first pitch axis and substantially orthogonal to the first yaw axis, and
   wherein the third strut is articulated with the second strut for relative angular displacement about a second yaw axis substantially parallel to the first yaw axis.

2. The end effector as claimed in claim 1, further comprising:
   a second member having: first, second, and third, serially articulated struts,
   wherein the first strut of the second member is articulated with the base part, to one side of the first-member, for relative angular displacement with respect to the base part about a third yaw axis and about a third pitch axis substantially orthogonal to the third yaw axis,
   wherein the second strut of the second member is articulated with the first strut of the second member for relative angular displacement about a fourth pitch axis substantially parallel to the third pitch axis, and
   wherein the third strut of the second member is articulated with the second strut of the second member for relative angular displacement about a fifth pitch axis substantially parallel to the third and fourth pitch axes.

3. An anthropomorphic hand, endo-skeletally comprising:
   a palm-defining base structure having first and second palm parts in a side-by-side configuration;
   first, second, third, and fourth finger-representing digits, each of which comprises proximal, middle, and distal serially articulated struts corresponding to the proximal, middle, and distal phalanges of the human finger; and
   a thumb-representing digit, proximal to one side of the first finger-representing digit and having proximal, middle, and distal serially articulated struts, corresponding to the proximal, middle, and distal phalanges of the human thumb,
   wherein the proximal strut of the first finger-representing digit is articulated with the first palm part for angular displacement about, firstly, a first yaw axis, and secondly, about a first pitch axis substantially orthogonal to the first yaw axis,
   the proximal strut of the second finger-representing digit is articulated with the first palm part for angular displacement about, firstly, a second yaw axis substantially parallel to the first yaw axis, and secondly, about a second pitch axis substantially orthogonal to the second yaw axis and substantially parallel to the first pitch axis,
   the middle strut of the first finger-representing digit is articulated with the proximal strut of the first finger-representing digit for angular displacement about a third pitch axis substantially parallel to the first pitch axis,
   the middle strut of the second finger-representing digit is articulated with the proximal strut of the second finger-representing digit for angular displacement about a fourth pitch axis substantially parallel to the second pitch axis,
   the distal strut of the first finger-representing digit is articulated with the middle strut of the first finger-representing digit for angular displacement about a fifth pitch axis substantially parallel to the first and third pitch axes,
   the distal strut of the second finger-representing digit is articulated with the middle struts of the second finger-representing digit for angular displacement about a sixth pitch axis substantially parallel to the second and fourth pitch axes,
   of the proximal struts of the third and fourth finger-representing digits, at least the proximal strut of the fourth finger-representing digit is articulated with the second palm part for angular displacement about, firstly, a third yaw axis substantially parallel to the first and second yaw axes, secondly, for angular displacement about a seventh pitch axis substantially orthogonal to the third yaw axis and substantially parallel to the first and second pitch axes, and, thirdly, for angular displacement about an axis which is inclined at an acute angle in a direction towards the first and second finger-representing digits,
   the proximal strut of the thumb-representing digit is articulated with the first palm part for angular displacement about an eighth pitch axis, and about a first roll axis substantially orthogonal to the eighth pitch axis,
   the middle strut of the thumb-representing digit is articulated with the proximal strut of the thumb-representing digit for angular displacement about, firstly, a fourth yaw axis substantially orthogonal to the eighth pitch axis and the first roll axis, and, secondly about a ninth pitch axis substantially parallel to the eighth pitch axis,
   the distal strut of the thumb-representing digit is articulated with the middle strut of the thumb-representing digit for angular displacement about a fifth yaw axis substantially parallel to the fourth yaw axis, and
   a location of the articulation of the proximal strut of the thumb-representing digit with the first palm part is substantially closer to a bottom marginal portion of the first palm part than are locations of the articulations of the proximal struts of the first and second finger-representing digits with the first palm part.

4. The anthropomorphic hand as claimed in claim 3, wherein the third finger-representing digit is articulated with the second palm part for angular displacement about, firstly, a sixth yaw axis substantially parallel to the first, second and third yaw axes, secondly, for angular displacement about a tenth pitch axis substantially orthogonal to the sixth yaw axis and substantially parallel to the first, second and seventh pitch axes, and, thirdly, for angular displacement about an axis which is inclined substantially parallel to the axis which is inclined at an acute angle.

5. The anthropomorphic hand as claimed in claims 3 or 4, wherein angular displacement about the fifth yaw axis between the distal and middle struts of the thumb-representing digit is in the range −45° to 90°.

6. The anthropomorphic hand as claimed in claim 5, wherein angular displacement about the fourth yaw axis between the middle and proximal struts of the thumb-representing digit is in the range −30° and 60°, and angular displacement about the ninth pitch axis between the middle and proximal struts of the thumb-representing digit is in the range +20° and −20°.

7. The anthropomorphic hand as claimed in claim 5, wherein angular displacement about the fifth yaw axis between the distal and middle struts of the thumb-representing digit is within the range −30° and +60°.

8. The anthropomorphic hand as claimed in claims 3 or 4, further comprising a forearm part, the hand being articulated with the forearm part at the first and second palm parts for angular displacement about, firstly, an eleventh pitch axis and, secondly, about a seventh yaw axis, wherein the eleventh pitch axis and the seventh yaw axis are displaced with respect to one another.

* * * * *

UNITED STATES PATENT AND TRADEMARK OFFICE
CERTIFICATE OF CORRECTION

| | | |
|---|---|---|
| PATENT NO. | : 7,673,916 B2 | Page 1 of 1 |
| APPLICATION NO. | : 11/198845 | |
| DATED | : March 9, 2010 | |
| INVENTOR(S) | : Richard Martin Greenhill et al. | |

It is certified that error appears in the above-identified patent and that said Letters Patent is hereby corrected as shown below:

ON THE COVER PAGE:

Item (75) Inventors: Replace "Hugo Elias" with --John Hugo Elias--.

Signed and Sealed this

Fourteenth Day of December, 2010

David J. Kappos
*Director of the United States Patent and Trademark Office*